US012644364B2

(12) United States Patent
Rutter

(10) Patent No.: US 12,644,364 B2
(45) Date of Patent: Jun. 2, 2026

(54) SUBMERSIBLE PUMPING SYSTEMS WITH INTAKE MODULES HAVING TANGENTIAL FLUID INTAKE PORTS

(71) Applicant: Baker Hughes Oilfield Operations LLC, Houston, TX (US)

(72) Inventor: Risa Rutter, Edmond, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/654,963

(22) Filed: May 3, 2024

(65) Prior Publication Data

US 2025/0341154 A1    Nov. 6, 2025

(51) Int. Cl.
| | |
|---|---|
| *E21B 43/12* | (2006.01) |
| *B01D 19/00* | (2006.01) |
| *E21B 43/34* | (2006.01) |
| *E21B 43/38* | (2006.01) |
| *F04B 47/06* | (2006.01) |

(Continued)

(52) U.S. Cl.
CPC ........ *E21B 43/128* (2013.01); *B01D 19/0057* (2013.01); *E21B 43/35* (2020.05); *E21B 43/38* (2013.01); *E21B 43/385* (2013.01); *F04B 47/06* (2013.01); *F04C 13/008* (2013.01); *F04D 13/10* (2013.01); *F04C 2240/102* (2013.01)

(58) Field of Classification Search
CPC ......... E21B 43/12–13; E21B 43/34–40; B01D 19/0057
See application file for complete search history.

(56) References Cited

U.S. PATENT DOCUMENTS 2,311,963 A  *  2/1943  Pyle ........................ F04D 13/10
                                                    96/194
2,355,259 A     8/1944  Cotesworth et al.
                        (Continued)

FOREIGN PATENT DOCUMENTS

CA         2736736 C     5/2017
CN       108386160 A     8/2018
                        (Continued)

OTHER PUBLICATIONS

International Search Report and Written Opinion dated Jul. 10, 2025 for PCT/US2025/027365.

*Primary Examiner* — Laert Dounis
(74) *Attorney, Agent, or Firm* — Baker Hughes Company

(57) ABSTRACT

A submersible pumping system for producing two-phase fluids from a well includes an intake module between a production pump and a motor. The intake module includes a housing, a first stage chamber inside the housing, and a second stage chamber inside the first stage chamber. The second stage chamber is in fluid communication with the production pump. The intake module further includes a plurality of tangential fluid intake ports that extend from the wellbore through the housing into the first stage chamber. The plurality of tangential fluid intake ports are configured to induce a swirling motion of two-phase fluid in the first stage chamber that encourages separation of liquids and gases. The intake module also includes a plurality of gas discharge ports that extend from the wellbore to the first stage chamber, where the plurality of gas discharge ports are located above the plurality of tangential fluid intake.

17 Claims, 5 Drawing Sheets

(51) Int. Cl.
  *F04C 13/00*    (2006.01)
  *F04D 13/10*    (2006.01)

(56)         References Cited

U.S. PATENT DOCUMENTS

| | | | |
|---|---|---|---|
| 2,929,501 | A | 3/1960 | Fenske et al. |
| 3,289,608 | A | 12/1966 | Laval |
| 3,624,822 | A * | 11/1971 | Carle ..................... F04D 9/002 |
| | | | 417/313 |
| 3,986,552 | A | 10/1976 | Scott |
| 4,253,481 | A | 3/1981 | Sarlls |
| 4,901,413 | A * | 2/1990 | Cotherman ............. F04D 9/001 |
| | | | 417/244 |
| 5,271,725 | A | 12/1993 | Freet et al. |
| 5,344,269 | A | 9/1994 | Banks |
| 5,433,269 | A | 7/1995 | Hendrickson |
| 5,553,669 | A | 9/1996 | Trainer |
| 5,660,533 | A | 8/1997 | Cartwright |
| 6,126,416 | A | 10/2000 | Lee |
| 6,186,227 | B1 | 2/2001 | Vaynshteyn et al. |
| 6,315,050 | B2 | 11/2001 | Vaynshteyn et al. |
| 6,322,616 | B1 * | 11/2001 | Kennedy ................. E21B 43/38 |
| | | | 96/208 |
| 6,357,530 | B1 * | 3/2002 | Kennedy ................. F04F 5/464 |
| | | | 417/108 |
| 6,382,317 | B1 * | 5/2002 | Cobb ..................... E21B 43/35 |
| | | | 96/216 |
| 6,564,876 | B2 | 5/2003 | Vaynshteyn et al. |
| 6,619,390 | B1 | 9/2003 | Kellett |
| 6,899,176 | B2 | 5/2005 | Hailey et al. |
| 7,387,158 | B2 | 6/2008 | Murray et al. |
| 7,552,777 | B2 | 6/2009 | Murray et al. |
| 7,713,035 | B2 | 5/2010 | Ford |
| 8,322,450 | B2 | 12/2012 | Meijer |
| 8,584,744 | B2 | 11/2013 | Soni et al. |
| 8,998,586 | B2 | 4/2015 | Muhs |
| 9,447,661 | B2 | 9/2016 | Broussard et al. |
| 9,447,788 | B2 | 9/2016 | Henry et al. |
| 10,858,925 | B2 | 12/2020 | Brown et al. |
| 10,968,729 | B2 * | 4/2021 | Sylvester ................ E21B 33/12 |
| 11,131,179 | B2 | 9/2021 | Brown et al. |
| 11,371,332 | B2 | 6/2022 | Xiao et al. |
| 11,965,402 | B2 | 4/2024 | Brown et al. |
| 2002/0023750 | A1 | 2/2002 | Lopes et al. |
| 2002/0134554 | A1 * | 9/2002 | Schrenkel ............... E21B 43/38 |
| | | | 166/372 |
| 2003/0141056 | A1 | 7/2003 | Vandevier |
| 2004/0020638 | A1 | 2/2004 | Williams |

| | | | |
|---|---|---|---|
| 2004/0129432 | A1 | 7/2004 | Wills et al. |
| 2004/0131488 | A1 | 7/2004 | Locher |
| 2005/0199551 | A1 | 9/2005 | Gordon |
| 2005/0281683 | A1 | 12/2005 | Brown et al. |
| 2007/0074872 | A1 * | 4/2007 | Du ......................... E21B 4/003 |
| | | | 166/369 |
| 2008/0093085 | A1 | 4/2008 | Knight et al. |
| 2008/0110614 | A1 | 5/2008 | Orban |
| 2009/0065202 | A1 | 3/2009 | Brown et al. |
| 2010/0175869 | A1 | 7/2010 | Cobb |
| 2010/0206732 | A1 | 8/2010 | Hale |
| 2011/0024119 | A1 | 2/2011 | Wolf et al. |
| 2011/0180272 | A1 | 7/2011 | Head |
| 2012/0057965 | A1 | 3/2012 | Bergamini et al. |
| 2013/0025865 | A1 | 1/2013 | Knobloch et al. |
| 2013/0068455 | A1 | 3/2013 | Brown et al. |
| 2013/0075105 | A1 | 3/2013 | Morton |
| 2013/0306330 | A1 | 11/2013 | Bishop et al. |
| 2014/0332239 | A1 | 11/2014 | Porta |
| 2015/0053394 | A1 | 2/2015 | Reid et al. |
| 2015/0075772 | A1 | 3/2015 | Saponja et al. |
| 2015/0098840 | A1 | 4/2015 | Kowalchuk |
| 2015/0167652 | A1 | 6/2015 | Van et al. |
| 2015/0204158 | A1 | 7/2015 | Frisby et al. |
| 2015/0205158 | A1 | 7/2015 | Engel et al. |
| 2015/0275619 | A1 | 10/2015 | Slup |
| 2015/0345276 | A1 | 12/2015 | Jensen |
| 2016/0003031 | A1 | 1/2016 | Xin et al. |
| 2016/0130919 | A1 | 5/2016 | Vasques |
| 2016/0222770 | A1 | 8/2016 | Kirk et al. |
| 2017/0175468 | A1 | 6/2017 | Vail, III et al. |
| 2017/0241215 | A1 | 8/2017 | Kleppa |
| 2017/0292361 | A1 | 10/2017 | Beauquin et al. |
| 2017/0342798 | A1 | 11/2017 | Wutherich |
| 2018/0112509 | A1 | 4/2018 | Saponja et al. |
| 2018/0171763 | A1 | 6/2018 | Malbrel et al. |
| 2018/0179852 | A1 | 6/2018 | Hou et al. |
| 2018/0223642 | A1 | 8/2018 | Zahran |
| 2018/0298736 | A1 | 10/2018 | Bailey et al. |
| 2020/0378235 | A1 | 12/2020 | Gonzales et al. |
| 2021/0164475 | A1 | 6/2021 | Webster et al. |
| 2021/0301636 | A1 * | 9/2021 | Conrad ................. F04D 29/086 |
| 2023/0108948 | A1 | 4/2023 | Brown et al. |

FOREIGN PATENT DOCUMENTS

| | | |
|---|---|---|
| CN | 112832734 B | 8/2022 |
| GB | 2365046 A | 2/2002 |
| RU | 200081 U1 | 10/2020 |
| WO | 2012169904 A2 | 12/2012 |

* cited by examiner

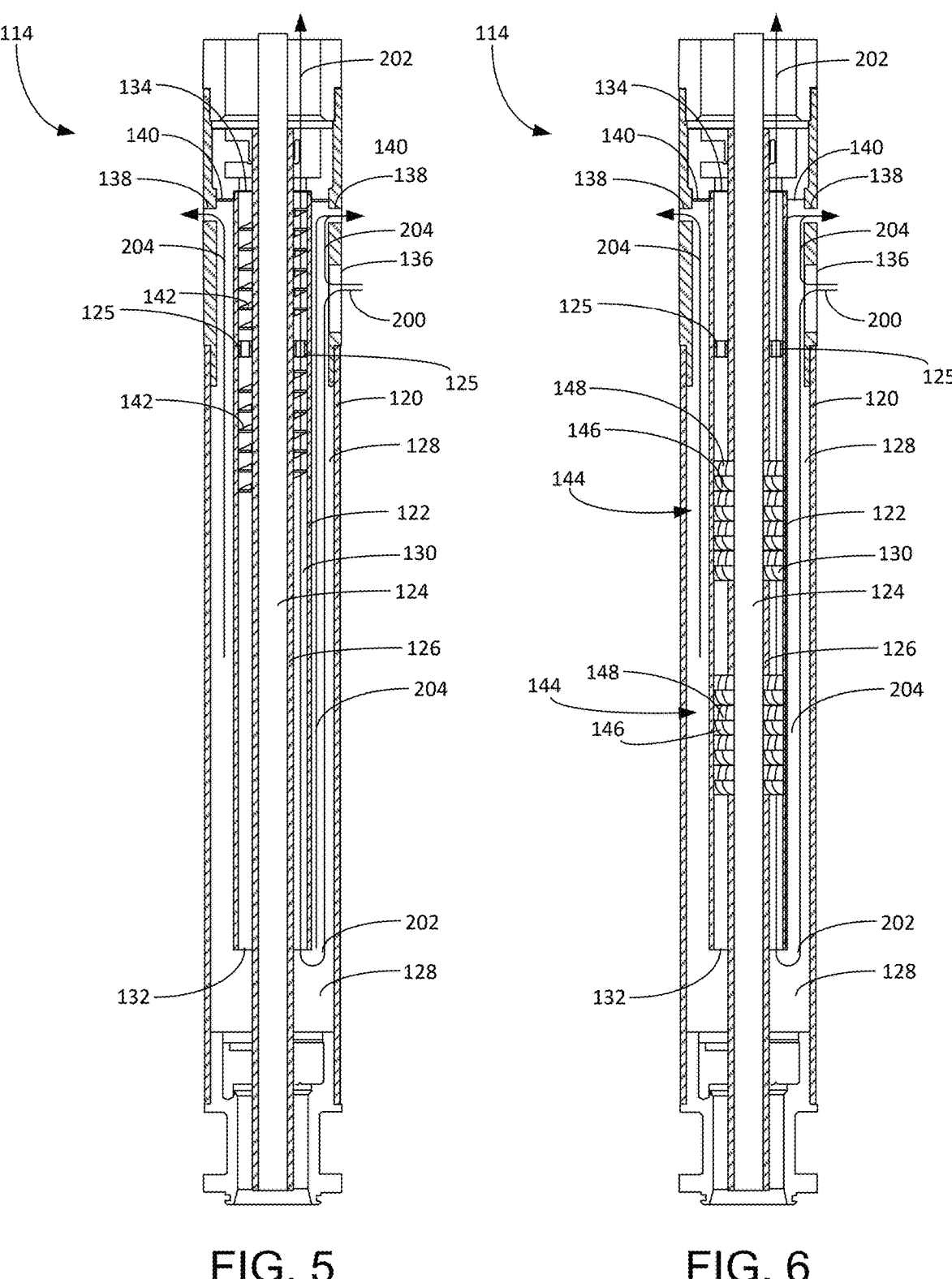
FIG. 5                    FIG. 6

SUBMERSIBLE PUMPING SYSTEMS WITH INTAKE MODULES HAVING TANGENTIAL FLUID INTAKE PORTS

FIELD OF THE INVENTION

This invention relates generally to the field of downhole pumping systems, and more particularly to systems and methods for optimizing pumping operations in wells with a high gas-to-liquid ratio.

BACKGROUND OF THE INVENTION

Submersible pumping systems are often deployed into wells to recover petroleum fluids from subterranean reservoirs. Typically, a submersible pumping system includes a number of components, including an electric motor coupled to one or more pump assemblies. Production tubing is connected to the pump assemblies to deliver the wellbore fluids from the subterranean reservoir to a storage facility on the surface. In many cases, the pump assemblies are multi-stage centrifugal pumps that include a plurality of stages, with each stage including a stationary diffuser and a rotary impeller that is connected to a shaft driven by the electric motor.

Hydrocarbon fluids produced from subterranean wells often include liquids and gases. Although both may be valuable, the multiphase flow may complicate recovery efforts. For example, naturally producing wells with elevated gas fractions may overload phase separators located on the surface. This may cause gas to be entrained in fluid product lines, which can adversely affect downstream storage and processing.

In wells in which artificial lift solutions have been deployed, excess amounts of gases and solids in the wellbore fluid can present problems for downhole equipment that is primarily designed to produce liquid-phase products. In particular, fluid with a high gas-to-liquid ratio ("GLR") or gas volume fraction ("GVF") may adversely impact efforts to recover liquid hydrocarbons with pumping equipment. Liquid "slugging" occurs when large pockets of gas alternated with liquid slugs develop while the fluid flows to surface.

The centrifugal forces exerted by downhole turbomachinery tend to separate gas from liquid, thereby increasing the chances of gas interference or vapor lock. Downhole gas separators have been used to remove gas before the wellbore fluids enter the pump. In operation, wellbore fluid is drawn into the gas separator through an intake. A lift generator provides additional lift to move the wellbore fluid into an agitator. The agitator is typically configured as a rotary paddle that imparts centrifugal force to the wellbore fluid. As the wellbore fluid passes through the agitator, heavier liquid components, such as oil and water, are carried to the outer edge of the agitator blade, while lighter gaseous components remain closer to the center of the agitator. In this way, modern gas separators take advantage of the relative difference in specific gravities between the various components of the two-phase wellbore fluid to separate gas from liquid. Once separated, the liquid can be directed to the pump assembly and the gas vented to the wellbore from the gas separator.

In other cases, the downhole electric submersible pumping system is provided with a specialized intake that includes a gravity-based separation mechanism in which multi-phase fluids are drawn into the bottom of an intake chamber in which gases are allowed to escape from the top of the chamber and liquids are drawn downward before being directed back up toward the pump. This tortuous path separation system can be effective in lower production volume wells, but in higher flow rate applications the multi-phase fluid is moving too fast to permit gravity separation of the liquid and gases. There is, therefore, a need for an improved intake system for handling fluids with a high gas-to-liquid ratio.

SUMMARY OF THE INVENTION

In some embodiments, the present disclosure is directed to a submersible pumping system for producing a fluid from a wellbore through production tubing to a wellhead, where the pumping system includes a motor, a production pump driven by the motor, and an intake module between the motor and the production pump. The intake module includes a housing, a first stage chamber inside the housing, and a second stage chamber inside the first stage chamber. The second stage chamber is in fluid communication with the production pump. The intake module further includes a plurality of tangential fluid intake ports that extend from the wellbore through the housing into the first stage chamber, and a plurality of gas discharge ports that extend from the wellbore to the first stage chamber. The plurality of gas discharge ports are located above the plurality of tangential fluid intake.

In other embodiments, the present disclosure is directed at a submersible pumping system for producing a fluid from a wellbore through production tubing to a wellhead, where the pumping system includes a motor, a production pump driven by the motor, and a pair of intake modules connected together in a tandem configuration. A first (lower) intake module includes a housing, a first stage chamber inside the housing, a second stage chamber inside the first stage chamber, a plurality of tangential fluid intake ports that extend from the wellbore through the housing into the first stage chamber, and a plurality of gas discharge ports that extend from the wellbore to the first stage chamber. The plurality of gas discharge ports are located above the plurality of tangential fluid intake.

The second (upper) intake module is between the first intake module and the production pump. The second intake module includes a housing, a first stage chamber inside the housing and a second stage chamber inside the first stage chamber. The first stage chamber of the second intake module is in fluid communication with the second stage chamber of the first intake module and the second stage chamber of the second intake module is in fluid communication with the production pump. The second intake module also includes a plurality of tangential fluid intake ports that extend from the wellbore through the housing into the first stage chamber and a plurality of gas discharge ports that extend from the wellbore to the first stage chamber. The plurality of gas discharge ports are located above the plurality of tangential fluid intake.

In yet other embodiments, the present disclosure is directed to a submersible pumping system for producing two-phase fluids from a well, where the pumping system includes a motor, a seal section connected to the motor, a production pump driven by the motor, and an intake module between the seal section and the production pump. The intake module includes a housing, a first stage chamber inside the housing, and a second stage chamber inside the first stage chamber. The second stage chamber is in fluid communication with the production pump. The intake module further includes a plurality of tangential fluid intake ports that extend from the wellbore through the housing into the first stage chamber. The plurality of tangential fluid intake ports are configured to induce a swirling motion of two-phase fluid in the first stage chamber. The intake module also includes a plurality of gas discharge ports that extend from the wellbore to the first stage chamber, where the plurality of gas discharge ports are located above the plurality of tangential fluid intake.

BRIEF DESCRIPTION OF DRAWINGS

FIG. 5 is a side cross-sectional view of a second embodiment of the intake module of the pumping system of FIG. 1.

FIG. 6 is a side cross-sectional view of a third embodiment of the intake module of the pumping system of FIG. 1.

DETAILED DESCRIPTION

As used herein, the term "petroleum" refers broadly to all mineral hydrocarbons, such as crude oil, gas and combinations of oil and gas. The term "fluid" refers to both gases and liquids and the term "two-phase" refers to a fluid that includes a mixture of gases and liquids. It will be appreciated by those of skill in the art that, in the downhole environment, a two-phase fluid may also carry solids and suspensions. Accordingly, as used herein, the term "two-phase" not exclusive of fluids that contain liquids, gases, solids, or other intermediary forms of matter.

Figure 1:
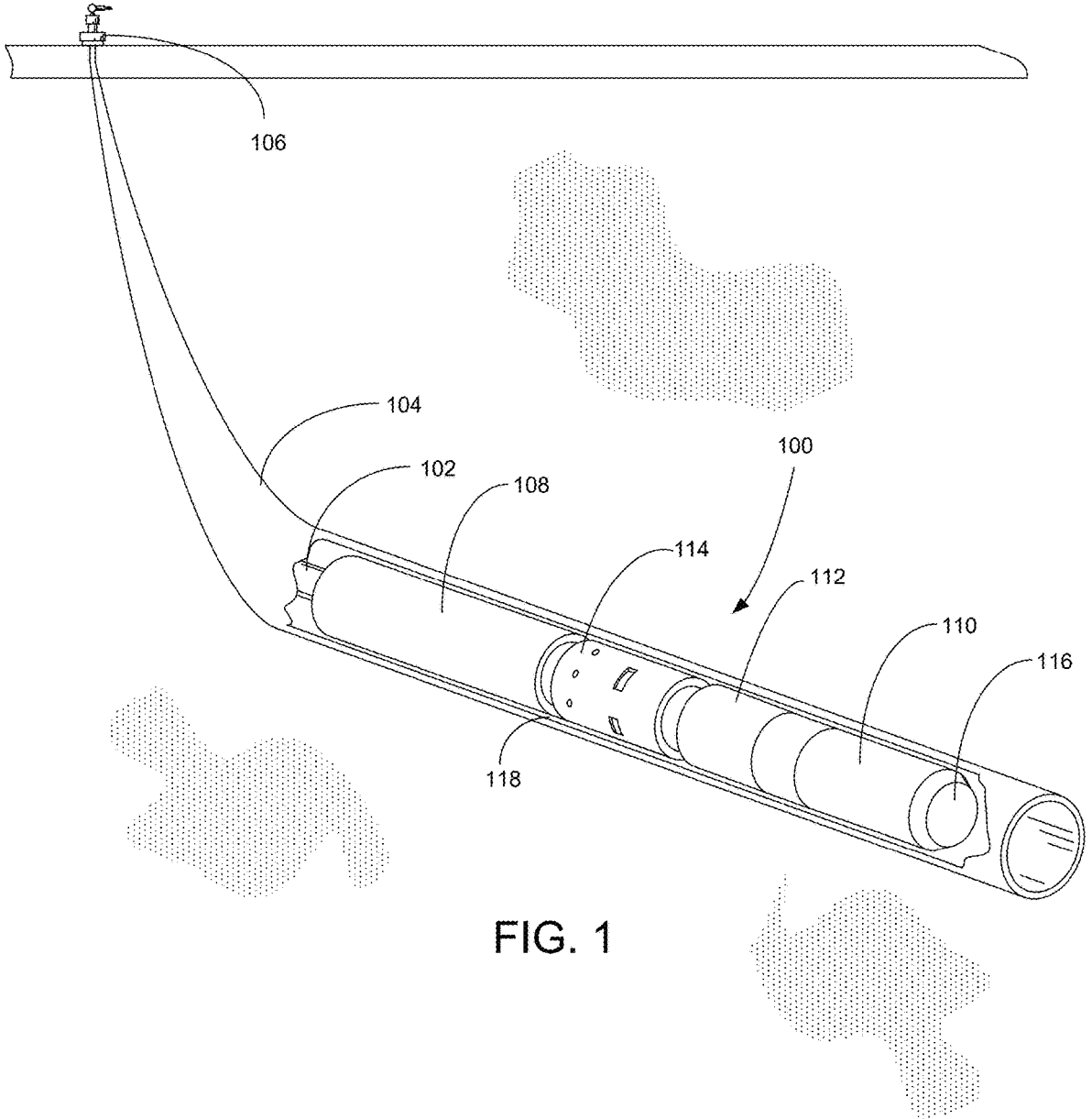
FIG. 1 depicts an electric submersible pumping system constructed in accordance with an exemplary embodiment.

FIG. 1 depicts a pumping system 100 attached to production tubing 102. The pumping system 100 and production tubing 102 are disposed in a wellbore 104, which is drilled for the production of a fluid such as water or petroleum. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations. Although the wellbore 104 is depicted as a wellbore that includes vertical and lateral portions, it will be appreciated that the pumping system 100 can also be deployed in wellbores with other configurations.

For the purposes of the disclosure herein, the terms "upstream" and "downstream" shall be used to refer to the relative positions of components or portions of components with respect to the general flow of fluids produced from the wellbore. "Upstream" refers to a position or component that is passed earlier than a "downstream" position or component as fluid is produced from the wellbore 104. The terms "upstream" and "downstream" are not necessarily dependent on the relative vertical orientation of a component or position. It will be appreciated that many of the components in the pumping system 100 are substantially cylindrical and have a common longitudinal axis that extends through the center of the elongated cylinder and a radius extending from the longitudinal axis in a lateral plane to an outer circumference. Objects and motion may be described in terms of axial, longitudinal, lateral, or radial positions within components in the pumping system 100.

In the embodiment depicted in FIG. 1, the pumping system 100 includes a production pump 108, a motor 110, a seal section 112, and an intake module 114. The seal section 112 is connected to a downstream end of the motor 110. The seal section 112 is positioned between the motor 110 and intake module 114. The seal section 112 shields the motor 110 from mechanical thrust and accommodates the expansion of motor lubricants during operation. The seal section 112 and motor 110 can be presented as a single, integrated unit or as two distinct components connected together.

The motor 110 receives electrical power through a power cable connected to a power source and motor drive on the surface. When energized, the motor 110 transfers torque to the production pump 108 through a series of interconnected shafts extending from the motor 110 to the production pump 108 through the seal section 112, intake module 114, and any additional intervening components. The motor 110 can be an induction motor or a permanent magnet motor. The pumping system 100 optionally includes a gauge or sensor 116 that is configured to measure various conditions in the wellbore 104, including but not limited to temperature, pressure, vibration, and operating conditions within the motor 110. The annular space surrounding the pumping system 100 and production tubing 102 in the wellbore 104 is referred to herein as the wellbore annulus 118.

The intake module 114 provides a path for fluids from the wellbore annulus 118 to enter the pumping system 100. In the embodiment depicted in FIG. 1, the production pump 108 is connected to a downstream end of the intake module 114. In this configuration, fluid entering the production pump 108 must first pass through the intake module 114. Although the intake module 114 is depicted as a separate component in FIG. 1, it will be understood that in other embodiments the intake module 114 is integrated into the seal section 112, production pump 108, or another component adjacent to production pump 108. In each case, the intake module 114 is configured to provide a direct or indirect path for fluid from the wellbore annulus 118 to the production pump 108, while reducing the gas content in the fluid before the fluid reaches the production pump 108.

Figures 2, 3A, 3B, 4:
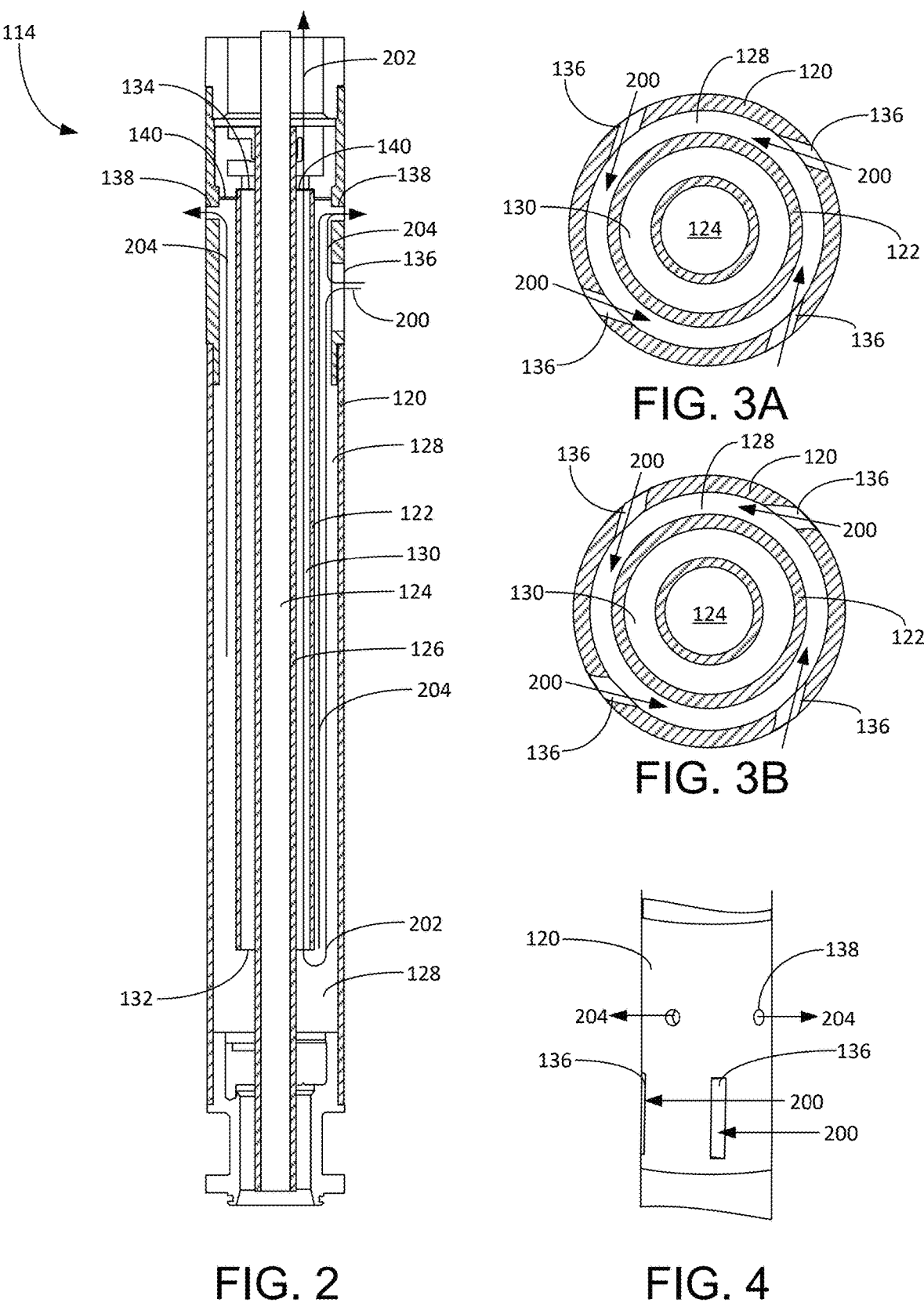
FIG. 2 is a side cross-sectional view of a first embodiment of the intake module of the pumping system of FIG. 1.
FIGS. 3A-3B are top cross-sectional views of different embodiments of the intake module of the pumping system of FIG. 2.
FIG. 4 is a partial side view of the exterior of the intake module of FIG. 2 illustrating the position of the tangential gas intake ports and gas discharge ports.

Turning to FIGS. 2-4, shown therein a depictions of the intake module 114. The intake module 114 includes an outer housing 120 that surrounds an inner cylinder 122. An intake module shaft 124 passes through the inner cylinder 122. In some embodiments, a shaft support tube 126 surrounds the intake module shaft 124 inside the inner cylinder 122. The annular space between the outer housing 120 and the inner cylinder 122 forms a first stage chamber 128, while the interior of the inner cylinder forms a second stage chamber 130. The inner cylinder 122 includes a lower opening 132 and an upper outlet 134. The upper outlet 134 is in direct or indirect fluid communication with the upstream end of the production pump 108.

The outer housing 120 includes one or more tangential fluid intake ports 136, one or more gas discharge ports 138, and upper cap 140. The upper cap 140 prevents fluid from passing from the first stage chamber 128 into the production pump 108 without first passing through the second stage chamber 130.

As illustrated in FIGS. 3A, 3B and 4, the tangential fluid intake ports 136 extend through the cylindrical outer housing 120 along a tangent such that fluid passing through the tangential fluid intake ports 136 is forced to rotate within the first stage chamber 128. The tangential fluid intake ports 136 optionally have a rectangular cross-section, as depicted in FIG. 4 and may extend through the outer housing 120 along a linear path as shown in FIG. 3A or curved path as shown in FIG. 3B. In each case, the geometry and orientation of the tangential fluid intake ports 136 is intended to direct fluid into the first stage chamber 128 such that the fluid contacts the outer surface of the inner cylinder 122 and the inner surface of the outer housing 120 with a low contact angle.

That is, in the embodiment depicted in FIG. 4, each of the tangential fluid intake ports 136 has a cross section bounded by a first side, a second side, a top and a bottom, and a depth extending through the outer housing 120, that cooperate to define a tangential intake port volume. A vertical plane extending through a center of the tangential fluid intake port volume that is substantially parallel to, or congruent with, the first side or second side of the tangential fluid intake port 136 does not intersect a longitudinal axis extending through the center of the outer housing 120. For tangential fluid intake ports 136 that have a non-rectangular cross section, for example circular, oval or irregular cross-sections, the central lateral axis extending through the tangential fluid intake port 136 does not intersect the central longitudinal axis of the outer housing 120.

Figure 7:
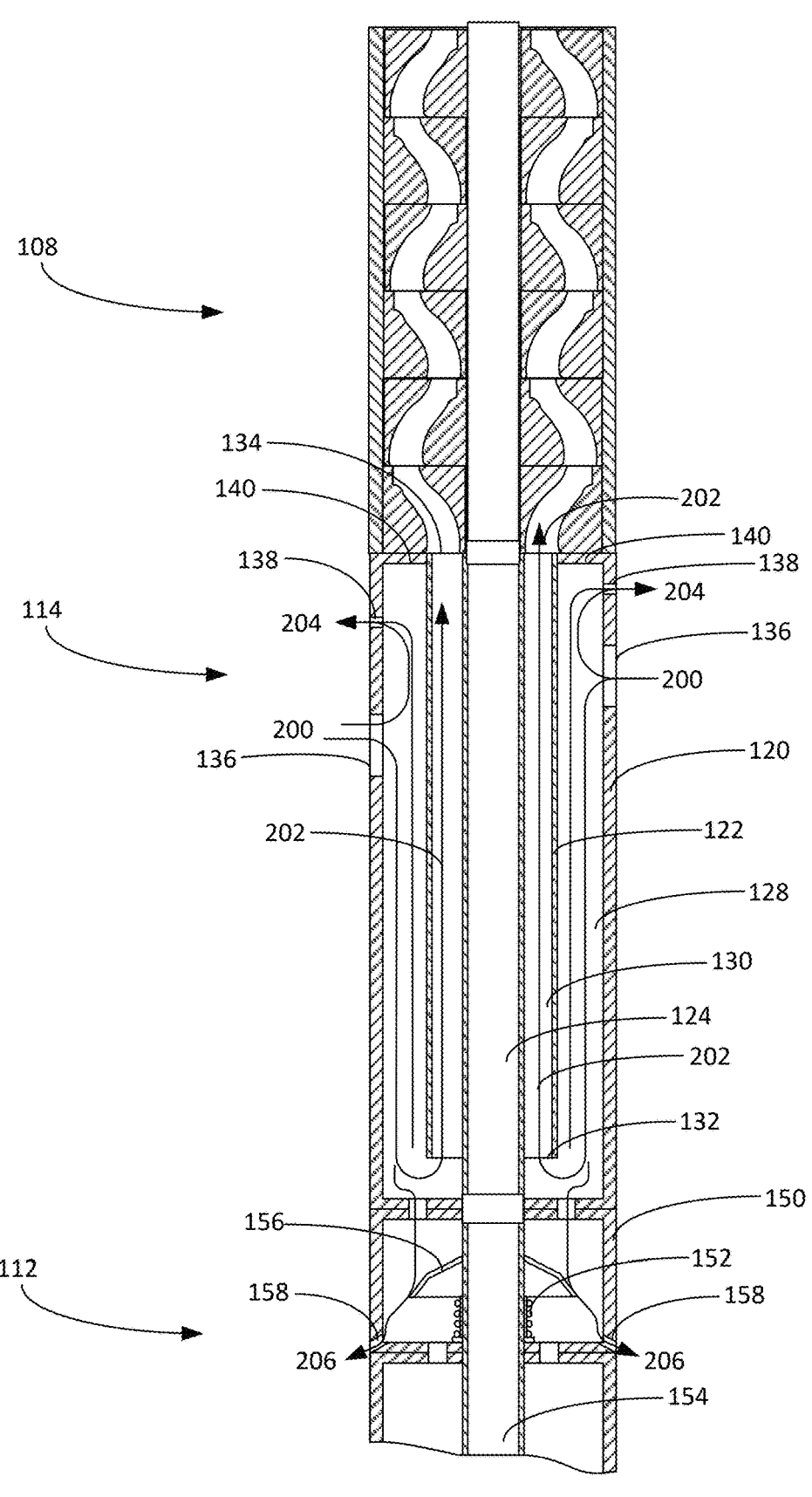
FIG. 7 is a side cross-sectional view of intake module of FIG. 2, illustrating the solid remove ports in the adjacent seal section or motor.

Each of the plurality of tangential fluid intake ports 136 is similarly oriented such that two-phase fluid 200 passing through the tangential fluid intake ports 136 is encouraged to swirl or rotate within the first stage chamber 128, in either clockwise or counterclockwise direction. In some embodiments, the tangential fluid intake ports 136 are oriented to induce a swirl in the first stage chamber 128 that matches the rotation of the intake module shaft 124. As depicted in FIG. 7, the tangential fluid intake ports 136 can be located along the outer housing 120 at different distances from the production pump 108. The centrifugal forces generated by the rotation of the fluid inside the first stage chamber 128 causes the denser, liquid-dominant portions of the fluid to collect along the inside surface of the outer housing 120, while lighter gas-dominant portions of the fluid collect along the outside surface of the inner cylinder 122.

As illustrated in FIG. 2, the induced swirl rapidly separates liquids 202 from gases 204 within the first stage chamber 128, with gases 204 rising along the inside of the first stage chamber 128 toward the upper cap 140. In the upper portion of the first stage chamber 128, the accumulating gases 204 collect and are discharged into the wellbore annulus 118 through the gas discharge ports 138. The gas discharge ports 138 can extend through the outer housing 120 along a tangential or non-tangential (radial) path.

The liquids 202 with a reduced gas fraction are pulled to the bottom of the first stage chamber 128 where the liquid-dominant fluid 202 enters the second stage chamber 130 through the lower opening 132. The liquid-dominant fluid 202 then passes through the internal second stage chamber 130 before passing into the production pump 108 through the upper outlet 134. In this way, as the fluids are being pulled downward through the first stage chamber 128, the lighter gases 204 are encouraged by gravity and centrifugal force to separate from denser fluids 202, which are then passed to the production pump 108 through the second stage chamber 130. The synergistic combination of centrifugal and gravity separation mechanisms allows the intake module 114 to remove gas 204 from two-phase fluids 200 more efficiently than conventional gravity-based intake systems.

Turning to FIG. 5, shown therein is an alternate embodiment of the intake module 114. In this embodiment, the intake module 114 includes one or more inducers 142 connected to, and configured for rotation with, the intake module shaft 124. The intake module shaft 124 is supported by spacer bearings 125 that permit the passage of fluid through the second stage chamber 130. The inducers 142 can be constructed as spiraled flights connected to the intake module shaft 124 such that rotation of the intake module shaft 124 causes the inducers 142 to act as a progressive cavity, screw-type pump that encourages the movement of low-gas-fraction fluid toward the production pump 108. In exemplary embodiments, the inducers 142 extend from the intake module shaft 124 to the inside surface of the inner cylinder 122. In some embodiments, the inner cylinder 122 rotates with the inducers 142 and intake module shaft 124.

In the embodiment depicted in FIG. 6, the inducers 142 have been replaced with centrifugal pump stages 144 that each include an impeller 146 and a diffusers 148. The impellers 146 are each attached to the intake module shaft 124 and configured for rotation, while the stationary diffusers 148 are connected to the inner cylinder 122. The impellers 146 can be configured as radial flow impellers that are well-suited for inducing flow through the intake module 114. In some embodiments, the intake module 114 includes both inducers 142 and centrifugal pump stages 144 that cooperatively push the liquid-dominant wellbore fluids toward the production pump 108.

Turning to FIG. 7, shown therein is a cross-sectional view of the intake module 114 connected between the production pump 108 and the seal section 112. In this embodiment, the seal section 112 includes a seal section head 150 that is in fluid communication with the first stage chamber 128. The seal section head 150 includes a shaft seal 152 around a seal section shaft 154, a sand shedder 156 connected to the seal section shaft 154, and solid discharge ports 158 in the bottom of the seal section head 150. During use, heavier solids entrained in the wellbore fluids entering the intake module 114 fall to the bottom of the intake module 114 and enter the seal section head 150. The sand shedder 156 can be attached to the seal section shaft 154 and configured to direct the particulate solids toward the solid discharge ports 158, where the solids can be discharged into the wellbore annulus 118. The solid discharge ports 158 ensure that solids do not accumulate in the bottom of the first stage chamber 128 of the intake module 114 to an extent the blocks flow into the second stage chamber 130.

Figures 8A, 8B, 8C, 8D, 8E:
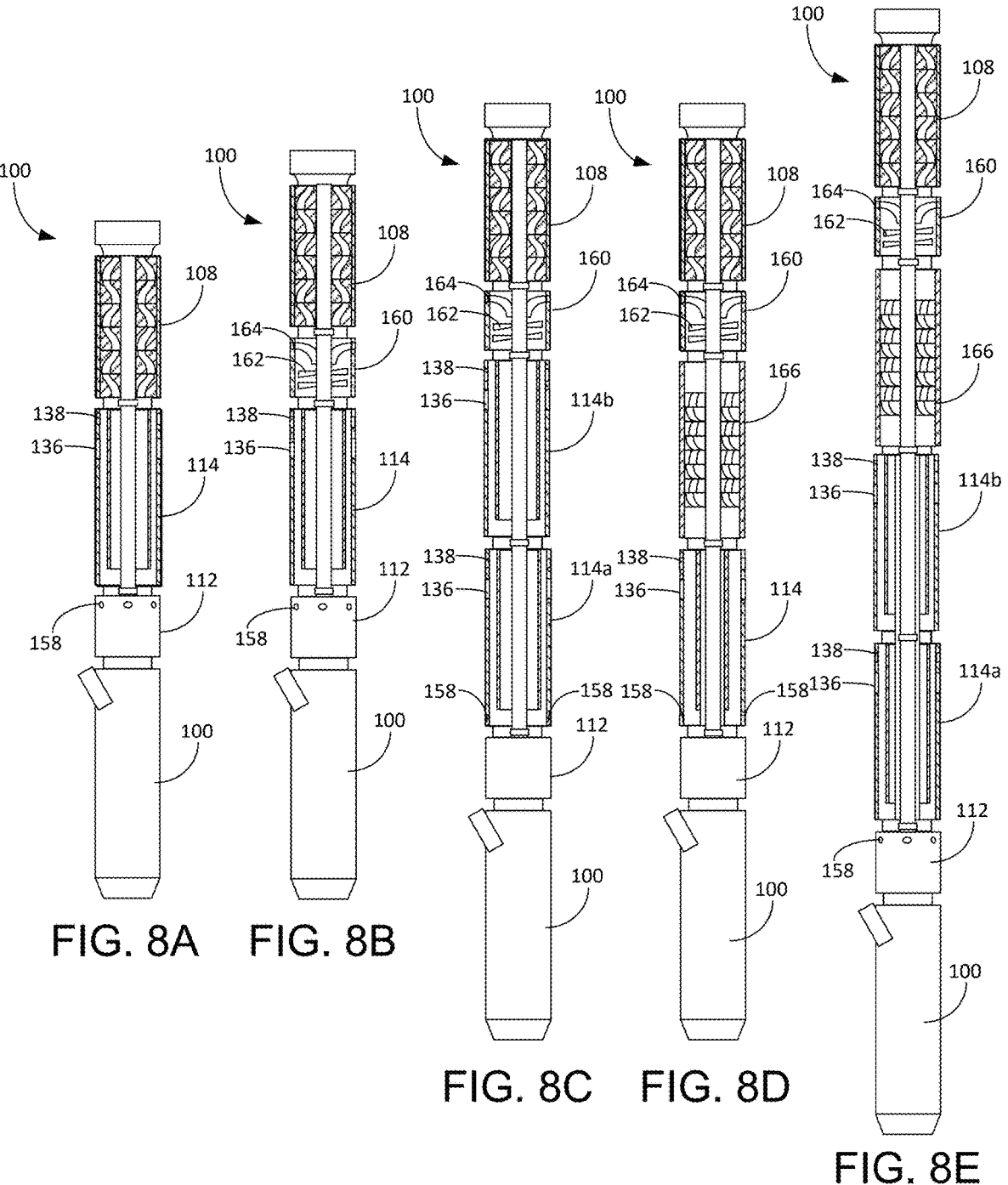
FIGS. 8A-8E depict various embodiments in which the gas module is combined with other components of the pumping system.

Turning to FIGS. 8A-8E, shown therein are various embodiments of the pumping system 100 in which the intake module 114 is combined with other components to provide suitable liquid-gas separation to ensure the production pump 108 is supplied with an intake stream with a satisfactory liquid-to-gas ratio. FIG. 8A, for example, depicts the embodiment in which the intake module 114 is positioned between the production pump 108 and the seal section 112. This is the embodiment also depicted in FIGS. 1 and 7. In this embodiment, two-phase fluid 200 enters the intake module 114, which removes gas 204 and passes a liquid-dominant feed stream 202 to the production pump 108. Solids 206 can be discharged through the solid discharge ports 158, which can be located in the bottom of the outer first stage chamber 128 (as illustrated in FIGS. 8C and 8D) or the top of the seal section 112 (as illustrated in FIGS. 8A, 8B and 8E).

The embodiment depicted in FIG. 8B includes a gas separator 160 located between the intake module 114 and the production pump 108. The gas separator 160 is generally configured to remove an additional portion of the gas from the two-phase fluid discharged by the intake module 114. The gas separator 160 includes an internal phase separation mechanism 162 and gas separator discharge ports 164. The internal phase separation mechanism 162 can be an active agitator system driven by a shaft connected to the motor 110 (as shown), or a passive, vortex-inducing element that relies on the movement of fluid by the production pump 108, or a combination of active (driven) and passive separation systems. In each case, the internal phase separation mechanism 162 can be configured to induce a rotation of the fluid discharged from the intake module 114 which tends to force heavier liquids radially outward while lighter gases remain nearer to the axial center of the gas separator 160. The internal phase separation mechanism 162 can include a crossover or similar device to direct the lighter gaseous components from the interior of the gas separator 160 to the wellbore annulus 118 through the gas separator discharge ports 164, while permitting the denser fluids to pass into the production pump 108.

The embodiment depicted in FIG. 8C also includes the gas separator 160, but in this embodiment the pumping system 100 includes two intake modules 114 connected together in a tandem configuration. The liquid-dominant fluid discharged from the lower intake module 114a is passed out of the upper outlet 134 of the inner cylinder 122 into the bottom of the first stage chamber 128 of the upper intake module 114b, where it mixes with fluids that entered the upper intake module 114b through the tangential fluid intake ports 136b of the upper intake module 114b. The gas separator 160 removes additional gas from the fluid discharged from the upper outlet 134b of the upper intake module 114b. In other embodiments, the pumping system 100 includes two or more intake modules 114 connected together between the seal section 112 and production pump 108, without the use of an intervening gas separator 160.

The pumping system 100 depicted in FIG. 8D includes a booster pump 166 between the gas separator 160 and the intake module 114. In some embodiments, the booster pump 166 is a multistage centrifugal pump that includes a plurality of stages that each include a stationary diffuser and a rotatable impeller connected to a pump shaft driven by the motor 110. The impellers and diffusers within the booster pump 166 can be configured to homogenize and reduce the volume of gas entrained in the fluid discharged from the intake module 114. The booster pump 166 increases the pressure of the pumped fluids in accordance with well-established pump mechanics in which kinetic energy is imparted to the fluid by the rotating impellers, which is then converted in part to pressure head by the stationary diffusers. As the pressure of the fluid increases through the successive stages of the booster pump 166, the gases and liquids are blended together and the increased pressure reduces the volume of gases entrained in the fluid.

In some embodiments, the booster pump 166 includes a progressive cavity or screw-type pumping mechanism. Some embodiments of the booster pump 166 include both turbomachinery and positive displacement pumping mechanisms. In each case, the booster pump 166 is used to increase the pressure of the fluid discharged from the intake module 114 before the fluid reaches the gas separator 160 and production pump 108. In certain applications, the booster pump 166 can be used to provide the gas separator 160 and production pump 108 with sufficient net positive suction head (NPSH) to permit the optimal performance of the production pump 108. In the embodiment depicted in FIG. 8E, the pumping system 100 includes tandem intake modules 114 that feed liquid-dominant fluid to the booster pump 166, which forces the fluid through the gas separator 160 and into the production pump 108.

It will be appreciated that the various embodiments of the pumping system 100 disclosed in FIGS. 8A-8E are provided as non-limiting examples and that other combinations of the production pump 108, motor 110, seal section 112, intake module 114, gas separator 160 and booster pump 166 are contemplated as falling within the scope of the embodiments discloses herein.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

It is claimed:

1. A submersible pumping system for producing fluid from a wellbore through production tubing to a wellhead, the pumping system comprising:
    a motor;
    a production pump driven by the motor; and
    an intake module between the motor and the production pump, wherein the intake module comprises:
        a housing;
        a first stage chamber inside the housing;
        a second stage chamber inside the first stage chamber, wherein the second stage chamber is in fluid communication with the production pump;
        a plurality of tangential fluid intake ports that extend from the wellbore through the housing into the first stage chamber;
        a plurality of gas discharge ports that extend from the wellbore to the first stage chamber, wherein the plurality of gas discharge ports are located above the plurality of tangential fluid intake ports;
        an intake module shaft driven by the motor; and
        one or more inducers connected to the intake module shaft and located inside the second stage chamber.

2. The submersible pumping system of claim 1, wherein each of the plurality of tangential fluid intake ports comprises:
    a cross section bounded by a first side, a second side, a top and a bottom;
    a depth extending through the housing; and
    a tangential fluid intake port volume defined by the cross section and depth.

3. The submersible pumping system of claim 2, wherein a vertical plane extending through a center of the tangential fluid intake port volume and substantially parallel with the first side or second side does not intersect a longitudinal axis extending through the center of the housing.

4. The submersible pumping system of claim 3, wherein the second stage chamber comprises:

a lower opening in fluid communication with the first stage chamber; and an upper outlet in fluid communication with the production pump.

5. The submersible pumping system of claim 4, wherein the pumping system further comprises a seal section between the motor and the intake module.

6. The submersible pumping system of claim 5, wherein the seal section comprises:

a shaft seal;

a sand shedder above the shaft seal; and a plurality of solid discharge ports below the sand shedder.

7. The submersible pumping system of claim 4, further comprising a gas separator between the intake module and the production pump.

8. The submersible pumping system of claim 7, wherein the gas separator comprises:

a gas separation mechanism; and gas separator discharge ports.

9. The submersible pumping system of claim 8, wherein the gas separation mechanism comprises an agitator driven by the motor.

10. The submersible pumping system of claim 8, further comprising a booster pump connected between the gas separator and the intake module.

11. The submersible pumping system of claim 10, wherein the booster pump comprises a plurality of centrifugal pump stages.

12. A submersible pumping system for producing fluid from a wellbore through production tubing to a wellhead, the pumping system comprising:

a motor;

a production pump driven by the motor; and a lower intake module between the motor and the production pump, wherein the lower first intake module comprises:

a housing;

a first stage chamber inside the housing;

a second stage chamber inside the first stage chamber;

a plurality of tangential fluid intake ports that extend from the wellbore through the housing into the first stage chamber; and a plurality of gas discharge ports that extend from the wellbore to the first stage chamber, wherein the plurality of gas discharge ports are located above the plurality of tangential fluid intake ports;

an intake module shaft driven by the motor;

one or more inducers connected to the intake module shaft and located inside the second stage chamber; and an upper intake module between the lower intake module and the production pump, wherein the upper intake module comprises:

a housing;

a first stage chamber inside the housing, wherein the first stage chamber of the upper intake module is in fluid communication with the second stage chamber of the lower intake module;

a second stage chamber inside the first stage chamber, wherein the second stage chamber is in fluid communication with the production pump;

a plurality of tangential fluid intake ports that extend from the wellbore through the housing into the first stage chamber; and a plurality of gas discharge ports that extend from the wellbore to the first stage chamber, wherein the plurality of gas discharge ports are located above the plurality of tangential fluid intake ports.

13. The submersible pumping system of claim 12, wherein each of the plurality of tangential fluid intake ports within the lower and upper intake modules comprises:

a cross section bounded by a first side, a second side, a top and a bottom;

a depth extending through the housing; and a tangential fluid intake port volume defined by the cross section and depth.

14. The submersible pumping system of claim 13, wherein a vertical plane extending through a center of the tangential fluid intake port volume and substantially parallel with the first side or second side does not intersect a longitudinal axis extending through the center of the housing.

15. The submersible pumping system of claim 14, further comprising a gas separator between the upper intake module and the production pump.

16. The submersible pumping system of claim 15, further comprising a booster pump between the upper intake module and the gas separator.

17. A submersible pumping system for producing fluid from a wellbore through production tubing to a wellhead, the pumping system comprising:

a motor;

a seal section connected to the motor;

a production pump driven by the motor; and an intake module between the seal section and the production pump, wherein the intake module comprises:

a housing;

a first stage chamber inside the housing;

a second stage chamber inside the first stage chamber, wherein the second stage chamber is in fluid communication with the production pump;

a plurality of tangential fluid intake ports that extend from the wellbore through the housing into the first stage chamber, wherein the plurality of tangential fluid intake ports are configured to induce a swirling motion of two-phase fluid in the first stage chamber;

a plurality of gas discharge ports that extend from the wellbore to the first stage chamber, wherein the plurality of gas discharge ports are located above the plurality of tangential fluid intake ports; and an inducer located inside the second stage chamber and driven by the motor.

* * * * *